US009896813B2

(12) United States Patent
Ford et al.

(10) Patent No.: US 9,896,813 B2
(45) Date of Patent: Feb. 20, 2018

(54) GELATIN SOLUTION

(71) Applicants: Nicholas Ford, Washington, DC (US); Gavin Garland, Washington, DC (US); Randy Garland, Washington, DC (US); Albert Kim, Washington, DC (US); Ian Lindberg, Washington, DC (US); John Lindberg, Washington, DC (US); Michael Mirabito, Washington, DC (US); Michael Nogaj, Washington, DC (US); Thomas Rafferty, Washington, DC (US); Rahul Rangarajan, Washington, DC (US); Michael Shepherd, Washington, DC (US)

(72) Inventors: Nicholas Ford, Washington, DC (US); Gavin Garland, Washington, DC (US); Randy Garland, Washington, DC (US); Albert Kim, Washington, DC (US); Ian Lindberg, Washington, DC (US); John Lindberg, Washington, DC (US); Michael Mirabito, Washington, DC (US); Michael Nogaj, Washington, DC (US); Thomas Rafferty, Washington, DC (US); Rahul Rangarajan, Washington, DC (US); Michael Shepherd, Washington, DC (US)

(*) Notice: Subject to any disclaimer, the term of this patent is extended or adjusted under 35 U.S.C. 154(b) by 0 days.

(21) Appl. No.: 15/250,955

(22) Filed: Aug. 30, 2016

(65) Prior Publication Data

US 2017/0051463 A1    Feb. 23, 2017

Related U.S. Application Data

(63) Continuation of application No. 14/541,080, filed on Nov. 13, 2014, now Pat. No. 9,458,587.

(60) Provisional application No. 61/905,868, filed on Nov. 19, 2013.

(51) Int. Cl.
*E02B 3/04* (2006.01)
*E02B 3/12* (2006.01)
(Continued)

(52) U.S. Cl.
CPC ............... *E02B 3/04* (2013.01); *C09J 189/06* (2013.01); *C09K 17/32* (2013.01); *E02B 3/16* (2013.01);
(Continued)

(58) Field of Classification Search
CPC ... E02B 3/04; E02B 3/12; E02B 3/126; C09K 17/32
(Continued)

(56) References Cited

U.S. PATENT DOCUMENTS

| | | | | | |
|---|---|---|---|---|---|
| 3,919,849 | A | * | 11/1975 | Hessert | C09K 17/32 405/264 |
| 3,950,179 | A | * | 4/1976 | Schneider | C08L 5/04 106/132.1 |
| 4,022,633 | A | * | 5/1977 | Schneider | C08K 5/05 106/132.1 |

(Continued)

FOREIGN PATENT DOCUMENTS

GB    1122308 A  *  8/1968  ............. C09K 17/50

*Primary Examiner* — Tara Mayo-Pinnock
(74) *Attorney, Agent, or Firm* — Isus Intellectual Property PLL

(57) ABSTRACT

A method of preventing soil erosion in, among areas, seaside locations, includes drilling holes in the ground and filling the holes with a mixture of the soil and gelatin, and then curing the mixture in situ to form a barrier against soil erosion.

9 Claims, 2 Drawing Sheets

(51) Int. Cl.
    *E02B 3/16*     (2006.01)
    *E02D 3/12*     (2006.01)
    *C09J 189/06*   (2006.01)
    *C09K 17/32*    (2006.01)

(52) U.S. Cl.
    CPC ........ *E02D 3/12* (2013.01); *E02D 2200/1685* (2013.01); *E02D 2250/003* (2013.01); *E02D 2250/0023* (2013.01); *E02D 2300/0082* (2013.01)

(58) Field of Classification Search
    USPC .................................................. 405/263–269
    See application file for complete search history.

(56) References Cited

U.S. PATENT DOCUMENTS

| | | | | |
|---|---|---|---|---|
| 4,040,258 | A * | 8/1977 | Argabright | C09K 8/512 166/293 |
| 5,514,412 | A * | 5/1996 | McArdle | C09K 17/16 427/136 |
| 5,718,750 | A * | 2/1998 | Weggel | A63H 33/001 106/134.2 |
| 5,975,797 | A * | 11/1999 | Thomas | A01G 25/06 405/36 |
| 6,042,305 | A * | 3/2000 | Novich | C09K 17/40 106/900 |
| 6,899,755 | B2 | 5/2005 | Perlman | |
| 7,484,330 | B2 * | 2/2009 | Lougheed | A01G 13/0262 47/9 |
| 2002/0026994 | A1 | 3/2002 | Herreid et al. | |
| 2007/0249504 | A1 * | 10/2007 | Ballard | C09K 8/203 507/207 |
| 2009/0304457 | A1 * | 12/2009 | Shimada | C09K 17/06 405/269 |
| 2011/0113983 | A1 * | 5/2011 | Bernu | C09K 17/50 106/15.05 |

* cited by examiner

GELATIN SOLUTION

RELATED APPLICATIONS

This application is a continuation application of U.S. patent application Ser. No. 14/541,080, filed Nov. 13, 2014, which is related to and claims priority to U.S. provisional application No. 61/905,868, filed Nov. 19, 2013, the entirety of which are herein incorporated by reference.

FIELD OF THE INVENTION

The present invention is in the field of prevention of sand and other soil erosion, a problem particularly on shorelines and beaches and one that will become more of an issue given the progress of global warming. Present-day solutions present many disadvantages and bad aftereffects.

BACKGROUND

Soil and beach erosion has become a worldwide problem, but is particularly serious and sometimes critical on shorelines. Existing methods of erosion control include so-called "hard" solutions such as riprap walls which are essentially piles of large rocks placed near the shore to prevent soil and sand erosion. Also known are concrete seawalls or piles driven into the soil to hold back existing soil and sand and prevent further erosion.

However, these prior art methods and structures come with many disadvantages. For example, some of these methods are environmentally unacceptable today, whereas in the past such methods were commonplace. One example of this is a use of chemically treated piles driven into the soil. These piles often contain harmful chemicals in order to prevent insect infestation and such chemicals may leach out into the soil and into the water itself. Furthermore, some other present-day methods and structures utilized may cause harm to the environment including both to the sand or soil as well as the water in which they are installed. Many of the current solutions do not provide an environmentally friendly, biodegradable solution to the problem of soil and sand erosion.

Contrary to the class of "hard" solutions to erosion control there is a class of methods known as "soft solutions." These "soft" solutions include biodegradable textiles to stabilize surfaces in combination with reintroduction of native species that reduce the impact of erosive forces through the natural root structure of plant colonies. However these methods require a stable environment during the period of time required for vegetation growth. These solutions also may include the use of sandbags which are an easy and convenient solution to redirect water and prevent damage to property. However, sandbags cannot be effectively used against wave action or standing water because if piled over two sandbags high they become unstable. Netting is effective for holding together vegetation and large objects such as rocks but small particles such as sand can slip right through the netting. Thus, what is desired to solve this problem is a "soft" technology method in the form of an engineered, environmentally acceptable, biodegradable solution to the problem of sand and soil erosion that is also economically feasible given the long coastlines that are now affected by erosion. Also, any solution must be one which can be easily implemented without expensive machinery and excessive labor costs.

SUMMARY OF THE PRESENT INVENTION

In one aspect, a method of controlling soil erosion is described which entails: creating a mixture of soil and liquid gelatin; forming a hole in the soil; injecting the mixture of soil and gelatin into the hole; and; allowing the mixture of soil and gelatin to cure, thereby forming a stabilization wall within the hole.

In another aspect, the soil at issue may be sand.

In another aspect, the mixture of soil and gelatin may be made by mixing sand and gelatin to the extent that the porosity in the soil is substantially filled with gelatin.

In yet another aspect, the hole may be formed using slurry drilling techniques.

In another aspect, a plurality of stabilization walls may be formed and placed seaside to a structure to be protected from erosion and the hole formed may be in the shape of a circular cylinder.

In another aspect, the mixture of soil and gelatin may be injected through a perforated pipe that is placed into the soil, the mixture exiting the pipe through the perforations to form a structure within the soil.

In another aspect, a substance to prevent soil erosion includes a mixture of soil and gelatin. The gelatin, when mixed with the soil, may occupy substantially all the porosity of the soil. The soil may be sand.

In another aspect, a system is disclosed to prevent soil erosion and includes one or more holes formed in the soil, the one or more holes being substantially filled with a mixture of the soil and gelatin; the one or substantially filled holes situated on the seaside of a structure to be protected against erosion.

DESCRIPTION OF THE PRESENT INVENTION

Figure 1:
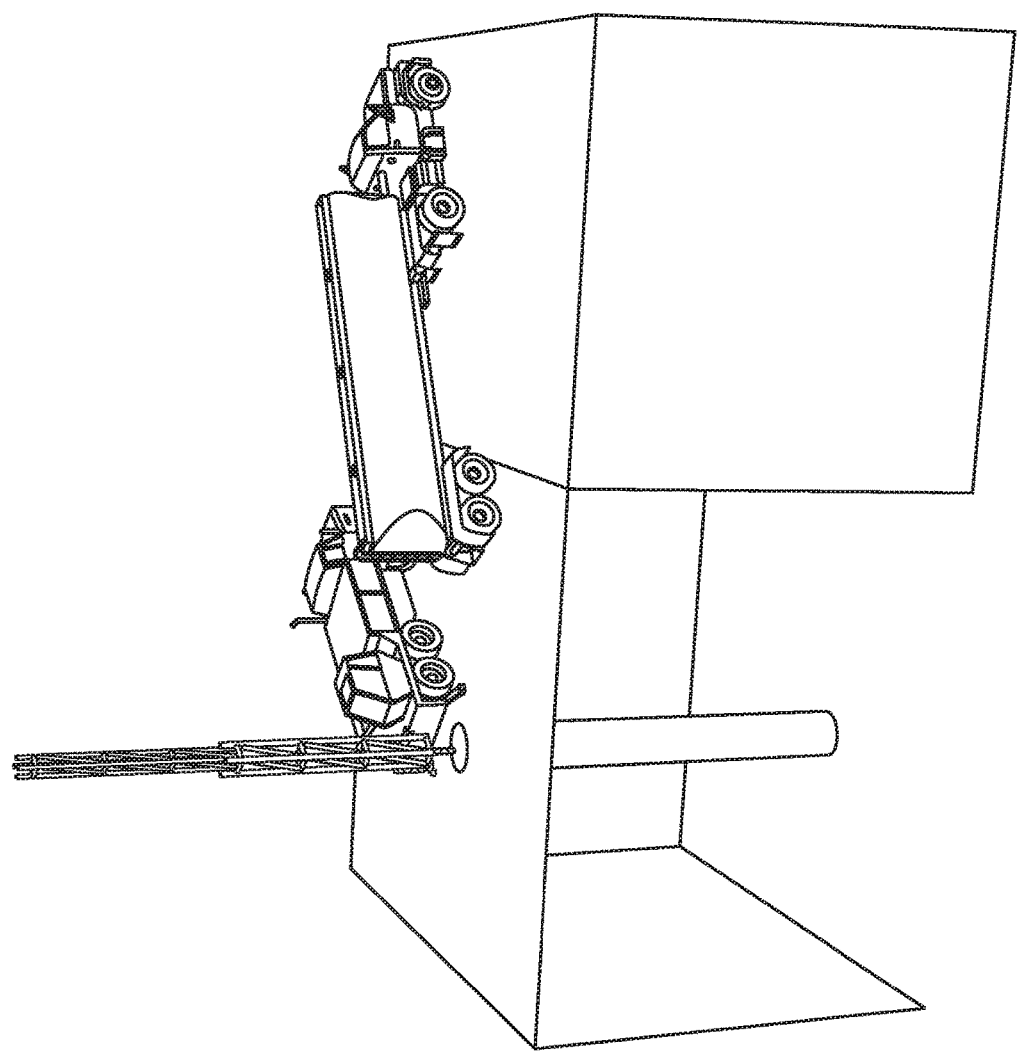
FIG. 1 illustrates the process of forming a hole in soil which includes a mixture of soil and gelatin.

Ideally, any solution to the sand and soil erosion problem would entail the use of relatively inexpensive materials that can be delivered easily to the sometimes distant and not readily accessible shorelines.

Some of the desirable attributes of a solution include the use of material which is: elastic, adhesive, non-toxic and biodegradable. Other attributes of a desirable material are: elasticity; adhesivity attributes; non-toxicity; biodegradability; low cost; can be installed with conventional methodologies; ability to polymerize in situ; resiliency; and stability.

One material which meets the requirements set forth above is gelatin. Gelatin, of course, is a known material for many purposes including as an ingredient in foodstuffs. One solution would be to mix soil or sand with gelatin in either a dry or liquid form, and then introduce the mixture into the sand or soil to provide stabilization for the sand of soil. Gelatin may be an ideal solution in that it is water-soluble, non-toxic, environmentally safe, and certainly less costly given that gelatin is a protein material which is sourced from body parts including skin and bones of animals and is in fact a byproduct of the meat production process. U.S. Publication Number 2002/0026994 is directed to the use of gelatin-coated sand to make molds for manufacturing products, but has no disclosure of such product being used for beach or soil erosion. U.S. Pat. No. 6,899,755 is directed to sand sculptures wherein sand is mixed with at least one non-toxic cold water—soluble adhesive agent selected from a group consisting of free gelatinized starches, chemically modified starches and chemically modified celluloses. Heretofore, however, there is no suggestion of using gelatinized sand or soil as an anchoring material to prevent sand and soil erosion.

It has been discovered that sand mixed with gelatin has the potential to prevent erosion. A brief synopsis of a method to form what we term sand/gelatin column is as follows: Gelatin, it appears, may be an ideal material for mixing with sand to prevent sand erosion on beaches. Sand and many soils, contrary to what one might normally think, have a high ratio of air to solids. For example, sand may have an air content of between 25% and 50%, making sand highly porous. This highly porous attribute allows for the in situ insertion and mixing and finally binding of gelatin to the sand or soil or soil particles feasible. After the investigation into the range of porosity values of various mineral materials it was discovered that sand and silt are relatively very porous, making them ideal materials with which to be mixed with gelatin.

The relative ratio of sand or soil to gelatin varies greatly, depending on the porosity of the sand or soil material, the particular formulation of gelatin utilized, and among other things desired rigidity of the resulting gelatin/sand mixture. In one embodiment, the desire is to substantially fill or occupy the porosity voids in the material, here sand, with the gelatin mixture. The developers of this novel application of gelatin to the problem of erosion control have found that saturation of the pore space with the highest viscosity gelatin solution that can flow into the given natural porous media provides the greatest strength and durability in the final mixture once it has set. The viscosity of the gelatin solution is determined by the proportion of water to gelatin in the mixing vessel. The ideal gelatin to water ratio for a given in situ application is best determined by removing a core sample similar to other soil testing methods and preparing samples of gelatin solution to porous media with varying concentrations of gelatin solution in order to optimize flow into the pore space. The strength and durability of the sand/gelatin mixtures may also be enhanced by admixtures of carefully selected biodegradable fibers at an appropriate size scale to maintain the ideal viscosity of the gelatin solution. Candidates currently under consideration include cellulose based fibers that can either be naturally occurring from plant materials or common synthetically derived fibers such as Rayon and Tencel®.

These sand/gelatin mixtures may be installed into the ground in any number of ways. One exemplary way is to sink a perforated well casing to a desired depth within the sand with conventional methods. In a next step, liquid or semi liquid gelatin under pressure is forced into the pipe under pressure The gelatin under pressure will exit through the perforations in the pipe and saturate the surrounding sand. The extent of saturation can be controlled by the gelatin solution viscosity, the amount of pressure applied to the gelatin, the number of perforations in the pipe, and the time duration of the application of gelatin under pressure to the sand. It is expected that, with this apparatus and methodology, the mixture of sand and gelatin would form a more or less solid cylinder structure. Before or when the sand and gelatin mixture has cured, the perforated well casing may be removed and either moved to the next desired position or be left in place to allow for future amelioration erosion by renewing the supply of gelatin and sand mixture moved to the next position to create another sand and gelatin solid cylindrical structure. Or alternatively a "well field" of perforated casings may be installed and reused as the gelatin biodegrades over time.

Figure 2:
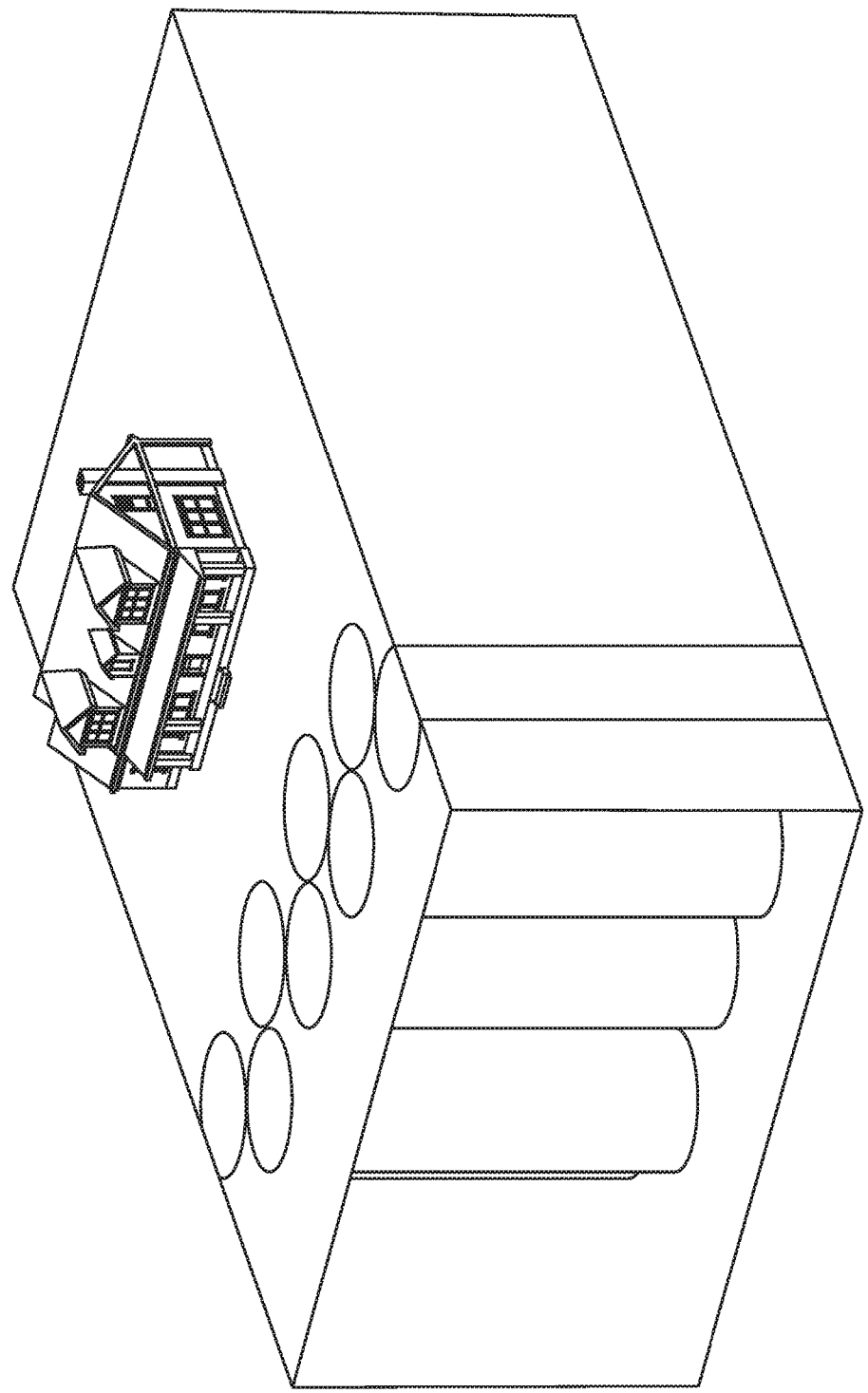
FIG. 2 illustrates the positioning or a plurality of holes filled with a mixture of soil and gelatin places seaside with respect to a structure to be protected.

Another embodiment of an apparatus and method which may be used and illustrated in FIG. 1 would borrow from the technology of slurry wall production and would involve using a cylindrical or hexagonal slurry wall type drill apparatus that would have attached to it a source of liquid or semi liquid gelatin. In operation, as the drill is forced into the sand and progresses to a desired depth, the sand would be mechanically mixed by the drill apparatus. The addition of the gelatin to the now mixing sand would cause saturation of the sand with the gelatin. The drill may then be reversed in direction and exit the now filled hole it had created leaving the gelatin to cure and form a solid cylindrical structure made of sand and gelatin. Multiple cylinders of gelatin mixture installed "seaside" to a structure to be protected is shown in FIG. 2.

In yet another embodiment, a biodegradable pipe of suitable material and suitable diameter may be sunk into the sand, the sand excavated from the interior of the pipe, mixed with gelatin and then reinserted into the interior of the pipe or even mixed in situ. Even after the pipe has degraded over time, the sand and gelatin mixture which is now solidified would be useful in preventing erosion.

Turning to FIG. 2 once again, this figure illustrates one possible embodiment in the application of the present invention to a beach erosion problem. As can be seen by reviewing FIG. 2, between the structure and the water a number of columns of a mixture of sand and gelatin have been placed as a barrier between the structure and the water. In the FIG. 2, eight of such columns are shown but any number, depth or width of sand/gelatin columns may be utilized depending on the extent of erosion, the depth of the sand, and other relevant factors.

Thus, we are presented herein improvements to the problem of soil and sand erosion using materials and apparatus that are environmentally friendly, that are biodegradable, and low in cost inasmuch as the materials for binding the sand or largely byproducts of the food industry. While the context of the present invention has been described in connection with erosion due to the action of water on a shoreline, it is to be understood that the techniques herein described may be used in any environment in which the desire is the prevent soil erosion. Also, it is to be understood that while the word "hole" or "holes" is used herein, the disclosure includes any form of depression in the soil, regardless of the depth or width and regardless of any orientation or shape. For example, while FIGS. 1 and 2 show vertically oriented cylinders, the shape may be polygonal ad the orientation may be horizontal to the soil surface or even at an angle to the soil surface other than 90 degrees as shown in FIGS. 1 and 2.

What we claim is:

1. A method of controlling sand erosion on a sandy shoreline comprising:
    providing a source of liquid gelatin;
    providing one or more perforated well casings;
    sinking the one or more perforated well casings into the sand in a sandy shoreline seaside to a structure to be protected from sand erosion;
    injecting the liquid gelatin into the one or more perforated casings under pressure to permeate and saturate the surrounding sand with the liquid gelatin, wherein the injected liquid gelatin saturates at least a portion of the sand surrounding the one or more perforated well casings;

allowing the mixture of sand and liquid gelatin to cure, thereby forming a stabilization volume to control sand erosion; and, wherein the gelatin saturates and permeates the porosity of the sand such that the porosity in the sand is substantially filled with cured gelatin.

2. The method of claim 1, wherein the one or more perforated well casings are removed after injection of the gelatin.

3. The method of claim 1, wherein the one or more perforated well casings are left in the sandy shoreline after injection of the gelatin to allow for additional renewed injection of gelatin.

4. The method of claim 1, wherein the one or more perforated well casings are of a biodegradable material.

5. The method of claim 1, wherein the stabilization volume is in the shape of one of a cylinder or a polygon.

6. The method of claim 5, wherein the stabilization volume is oriented one of: perpendicular, parallel to or at an angle other than 90 degrees or 0 degrees to the sandy shore.

7. The method of claim 1, further comprising the step of adding biodegradable fibers or other materials to the gelatin to enhance the stability and durability of the stabilization volume.

8. The method of claim 7, wherein the biodegradable fibers or other materials include one or more of: naturally occurring cellulose based fibers and synthetically derived fibers.

9. The method of claim 8, wherein the synthetically derived fibers include one or more of rayon or lyocell fibers.

\* \* \* \* \*